United States Patent [19]

Bagdis

[11] 4,290,683
[45] Sep. 22, 1981

[54] SONAR RESPONSIVE SHUTTER BLADE TIME OUT CONTROL CIRCUIT

[75] Inventor: Judy Bagdis, Bradford, Mass.

[73] Assignee: Polaroid Corporation, Cambridge, Mass.

[21] Appl. No.: 189,849

[22] Filed: Sep. 22, 1980

[51] Int. Cl.³ .................. G03B 3/00; G03B 7/097
[52] U.S. Cl. .................. 354/234; 354/23 D; 354/27; 354/195
[58] Field of Search .................. 354/27, 29, 30, 50, 354/51, 195, 234, 235, 23 D

[56] References Cited

U.S. PATENT DOCUMENTS

| | | | |
|---|---|---|---|
| 3,522,763 | 8/1970 | Dietz | 354/51 |
| 3,620,143 | 11/1971 | Burgarella | 354/49 |
| 3,942,183 | 3/1976 | Whiteside | 354/29 |
| 4,023,187 | 5/1977 | Shenk | 354/27 |
| 4,040,072 | 8/1977 | Johnson et al. | 354/173 |
| 4,192,587 | 3/1980 | La Rocque et al. | 354/27 |

Primary Examiner—Michael L. Gellner
Attorney, Agent, or Firm—Edward S. Roman

[57] ABSTRACT

An exposure control circuit for a photographic camera is provided for determining the camera-to-subject range directly by sonic ranging and for automatically responding to the sonically determined subject range to provide either a shortened maximum exposure interval time out period under conditions where the photographic subject is located far enough from the camera as to be just beyond the effective range of the flash or within the effective range of the flash but without sufficient reflectance to effect the termination of exposure solely as a function of scene light integration or an extended maximum exposure interval time out period under conditions where the photographic subject is located far enough from the camera as to be far beyond the effective range of the flash where there is likely to be little or no reflected flash light.

5 Claims, 4 Drawing Figures

SONAR RESPONSIVE SHUTTER BLADE TIME OUT CONTROL CIRCUIT

BACKGROUND OF THE INVENTION

1. Field of the Invention

This invention relates generally to a photographic camera exposure control circuit for controlling the maximum exposure time out period and, more particularly, to a photographic camera exposure control circuit for providing either a shortened or extended maximum exposure interval time out period dependent upon camera-to-subject distance as determined directly by means of sonic ranging.

2. Description of the Prior Art

In the photographic art, exposure control systems embodying scanning shutter blade elements which operate to vary the exposure aperture areas with time during the exposure interval are well known as indicated by U.S. Pat. No. 3,942,183, entitled "Camera with Pivoting Blades", by G. Whiteside, issued Mar. 2, 1976, in common assignment herewith. Such scanning shutter blade mechanisms generally include a pair of counter-reciprocating shutter blade elements each having a primary aperture that traverses the optical axis of the camera during the exposure interval. The primary apertures are shaped so that upon overlying one another during countermovement of the blades, there is defined an effective exposure aperture value which increases to a maximum value in a determinate period of time.

Exposure control is provided by a pair of secondary photocell apertures in the respective shutter blade elements which admit scene light to a photoresponsive element in correspondence with the scene light admitted to the focal plane during shutter blade movement through an exposure cycle. The output from the photoresponsive element is directed to an integration circuit which triggers upon reaching an integration level corresponding to a desired exposure value to terminate the exposure interval by returning the shutter blade elements back to their initial scene light blocking position.

Such exposure control systems may be utilized with a source of artificial illumination such as a flash bulb or electronic flash to provide artificial illumination not only during conditions of low ambient scene light intensity but also under conditions of high ambient scene light intensity where it becomes desirable to provide the artificial illumination to fill in the photographic subject against a brightly back lit scene as is more fully disclosed in U.S. Pat. No. 4,023,187, entitled "Exposure Control System with Fill Flash Race Condition", by E. Shenk, issued May 10, 1977, in common assignment herewith. The aforementioned artificial illumination control system operates under conditions of low ambient scene light intensity to fire the source of artificial illumination at a predetermined time period subsequent to the initiation of the exposure interval. Under conditions where the photographic subject is within the effective range of the flash and provides average scene light reflection, the light integration circuit will integrate the reflected scene light until reaching an integration level corresponding to a desired exposure value to terminate the exposure interval by returning the shutter blade elements back to their initial scene light blocking position.

However, under conditions where the photographic subject provides for a low degree artificial scene light reflection or is located beyond the effective range of the flash, there may be insufficient reflected scene light for the integration circuit to reach the integration level corresponding to the desired exposure value. Thus, it is also well known to provide an exposure interval time out circuit for limiting the maximum time that the shutter blade elements may remain in the scene light unblocking position. Such time out circuits are included in both SX-70 and Pronto! type cameras manufactured and sold by Polaroid Corporation and provide either an extended maximum exposure interval time out period in the order of 1-20 seconds when the source of artificial illumination is disconnected from the camera or a shortened maximum exposure interval time out period in the order of 65 milliseconds when the source of artificial illumination is connected to the camera. Such a shortened maximum exposure interval time out period can provide generally satisfactory results in situations where the photographic subject is located within the effective range of the flash and has a low scene light reflectance characteristic or where the subject is located just beyond the effective range of the flash and where there is still substantial reflected scene light albeit insufficient to cause the integration circuit to reach the required integration level corresponding to the desired exposure value within the shortened maximum exposure interval time out period. Under the aforementioned conditions, the photographic film may be slightly underexposed but may nevertheless provide a generally satisfactory photograph which is not blurred.

The above-mentioned extended maximum exposure time out interval is suitable for use under conditions where the photographic subject may be so far removed from the effective range of the flash that there is little or no reflected flash light. Under these conditions, it is desirable to extend the maximum time out period for the exposure interval far beyond the maximum allowable time to which an exposure interval may be extended without incurring the adverse blurring effects from the normally expected hand motion of a handheld camera. Under these conditions, it is preferable to utilize a tripod or some other stable means for mounting the camera so as not to incur adverse blurring effects. Thus, with such an extended maximum exposure interval time out period, it is possible for the photographic film to record all available ambient scene light such as starlight, street lights or building lights. Heretofore, whether the camera provided the photographer with an extended or shortened maximum exposure interval time out period depended upon whether the photographer connected the source of artificial illumination to the camera or not as previously discussed with respect to Polaroid's SX-70 and Pronto! type cameras. Thus, the photographer had to evaluate the camera-to-subject range as well as the probable flash light reflectivity of the subject in order to decide whether the best results could be achieved by either using the artificial illumination with a shortened maximum exposure interval time out period or by not using the artificial illumination and relying solely on the extended maximum exposure interval time out period to record all available scene light.

Therefore, it is a primary object of this invention to provide a photographic camera exposure control circuit for selectively differentiating between conditions where the photographic subject is located close enough to the camera that there is likely to be substantial but insufficient reflected flash light to effect the termination of exposure solely as a function of scene light integration and it is desirable to provide a shortened maximum exposure interval time out period and conditions where the photographic subject is located far enough from the camera that there is likely to be little or no reflected flash light and it is desirable to provide an extended maximum exposure interval time out period.

It is a further object of this invention to provide a photographic camera exposure control circuit for determining the camera-to-subject distance directly by sonic ranging and for automatically responding to the sonically determined subject distance to provide either a shortened maximum exposure interval time out period where the subject is located close enough to the camera that it is likely to be substantial but insufficient reflected flash light to effect the termination of exposure solely as a function of scene light integration or an extended maximum exposure interval time out period under conditions where the subject is located far enough from the camera that there is likely to be virtually no reflected flash light.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

An exposure control circuit is provided for controlling the maximum time out period for an exposure interval in a photographic camera apparatus of the type which includes means for defining a film plane, means for transmitting light from a scene along an optical path to expose photosensitive film located in the film plane, and an exposure control system for allowing the passage of scene light along the optical path to the film plane to define an exposure interval. The control circuit includes a clock for providing a train of clock pulses. A first counter is provided for counting the pulse train and providing a total pulse train count corresponding to the camera-to-subject distance range, and a second counter is provided for counting the pulse train and providing a pulse train count which commences generally in synchronism with the initiation of the exposure interval.

Binary logic circuits respond when the first counter provides a pulse train count corresponding to a camera-to-subject distance less than a select camera-to-subject distance to enable the decode of the second counter to provide an exposure interval termination signal upon the second counter reaching a pulse train count corresponding to a select maximum exposure interval time out period. The binary circuits further respond when the first counter provides a pulse train count corresponding to a camera-to-subject distance greater than the select camera-to-subject distance to enable the decode of the second counter to provide an exposure interval termination signal upon the second counter reaching a pulse train count corresponding to another maximum exposure interval time out period greater than the select maximum exposure interval time out period.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
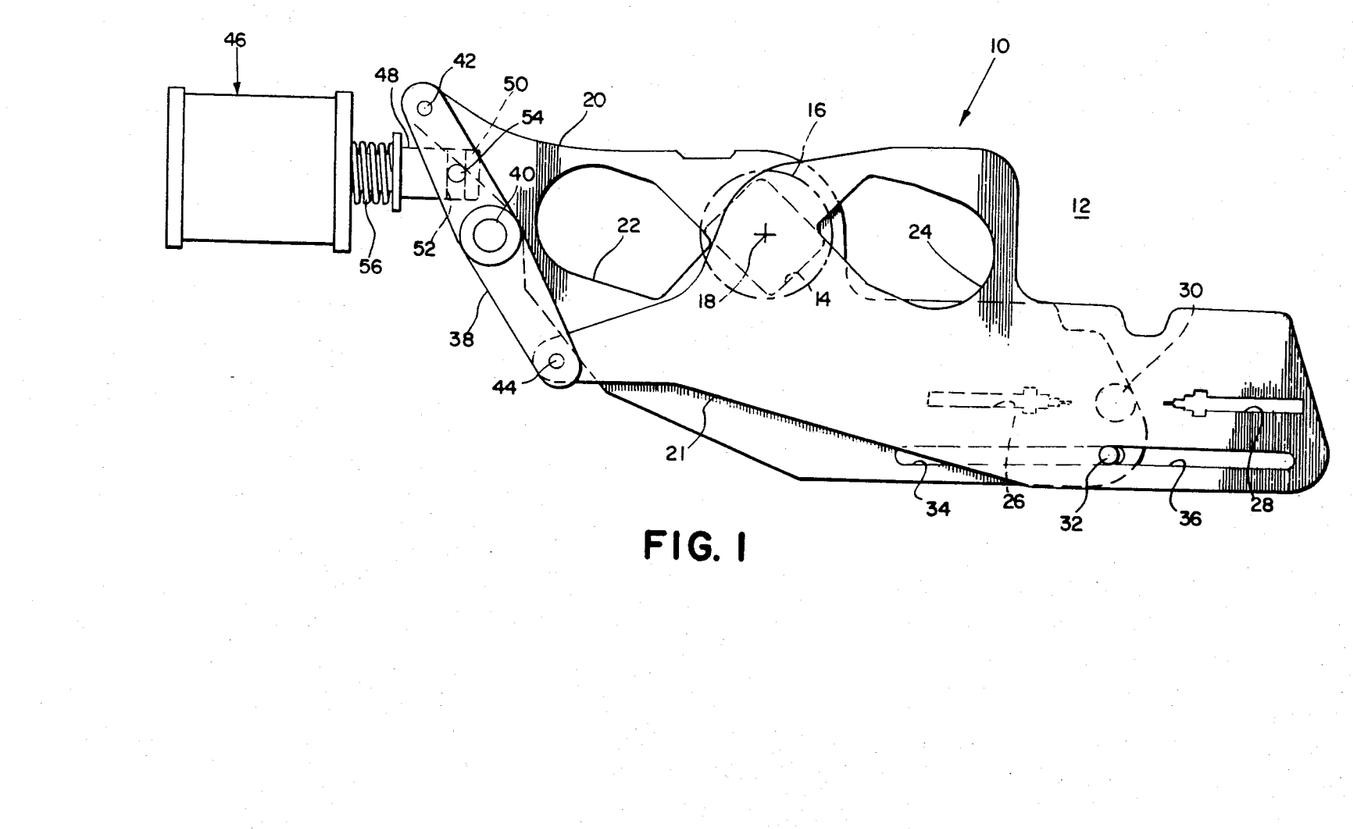
FIG. 1 is a front elevational view of the shutter blade mechanism of this invention.

Referring now to FIG. 1, there is shown generally at 10 a photographic exposure control apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens 16 is provided in overlying relation to the light entry opening 14 wherein the objective lens 16 may comprise a plurality of elements retained in spaced relation by a cylindrical lens mount or barrel which may be adapted in a well-known manner to provide translational movement of the elements of the lens 16 along a central optical axis 18 for focusing of image carrying rays through the light entry exposure opening 14. The image carrying rays are thereafter directed to a rearwardly positioned film plane (not shown) by way of a reflecting mirror (also not shown) all of which are stationed within a suitable light tight film exposure chamber (also not shown) in a manner as is more fully described in U.S. Pat. No. 4,040,072, entitled "Shutter Latch Arrangement Releasable Through Shutter Blade Actuation and Resettable Through Film Advancement", by B. Johnson et al., issued Aug. 2, 1977, in common assignment herewith and now incorporated by reference herein.

Intermediate the objective lens 16 and light entry exposure opening 14, there is provided a shutter blade mechanism two overlapping shutter blade elements 20 and 21 of the so-called "scanning type" which will be subsequently described in greater detail herein. A pair of scene light admitting primary apertures 22 and 24 are provided respectively in the blade elements 20 and 21 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by G. Whiteside, issued Mar. 2, 1977, in common assignment herewith and now incorporated by reference herein. The apertures 22 and 24 are selectively shaped so as to overlap the light entry exposure opening 14 thereby defining a gradually varying effective aperture size as a function of the position of the blade elements 20 and 21.

Each of the blades 20 and 21 may additionally be configured to have corresponding photocell sweep secondary apertures shown respectively at 26 and 28. Photocell sweep secondary apertures 26 and 28 may be configured to track in a predetermined corresponding relationship with respect to the scene light admitting primary apertures 22 and 24. As is readily apparent, the photocell sweep secondary apertures 26 and 28 move in the same manner as the primary apertures 22 and 24 to define a small secondary effective aperture for admitting the passage of scene light transmitted to a photoresponsive element 30 from the scene being photographed. The blades 20 and 21 also include respectively a third pair of apertures 26A and 28A which operate in a manner to be subsequently described herein.

Projecting from the baseblock casting 12 at a location spaced laterally apart from the light entry exposure opening 14 is a pivot pin or stud 32 which pivotally and translatably engages elongate slots 34 and 36 formed in respective shutter blade elements 20 and 21. Pin 32 may be integrally formed with the baseblock casting 12 and blade elements 20 and 21 may be retained in engaging relation with respect to the pin 32 by any suitable means such as peening over the outside end of pin 32.

The opposite ends of the blade elements 20 and 21 respectively include extended portions which pivotally connect to a walking beam 38. The walking beam 38, in turn, is disposed for rotation relative to the baseblock casting 12 by pivotal connection to a projecting pivot pin or stud 40 which may be integrally formed with the baseblock casting 12 at a location spaced laterally apart from the light entry exposure opening 14. The walking beam 38 may be pivotally retained with respect to the pin 40 by conventional means such as an E ring (not shown). In the preferred mode, the walking beam 38 is pivotally connected at its distal ends to the shutter blade elements 20 and 21 by respective pin members 42 and 44 which extend laterally outward from the walking beam 38. Pin members 42 and 44 are preferably circular in cross section and extend through respective circular openings in respective shutter blade elements 20 and 21. Thus, the shutter blade elements 20 and 21 provide a blade mechanism with the means for mounting the blade mechanism for movement being provided by the walking beam 38 together with the pivot pin 32.

Drive means are provided for displacing the blade mechanism and include a tractive electromagnetic device in the form of a solenoid 46 employed to displace the shutter blades 20 and 21 with respect to each other and the baseblock casting 12. The solenoid 46 includes an internally disposed cylindrical plunger unit 48 which retracts inwardly into the body of the solenoid upon energization of the solenoid winding. The solenoid plunger 48 includes an end cap 50 at the outside end thereof together with a vertical slot or groove 52 within the end cap 50 for loosely engaging a pin 54 extending outwardly from the walking beam 38. In this manner, the solenoid plunger 48 is affixed to the walking beam 38 so that longitudinal displacement of the plunger 48 will operate to rotate the walking beam about the pivot pin 40 so as to appropriately displace the shutter blades 20 and 21. The drive means may additionally include a helical compression spring 56 around the plunger 48 so as to continuously urge the end cap 50 outward of the solenoid 46, thereby also continuously urging the blade elements 20 and 21 into positions defining the largest effective primary aperture over the light entry exposure opening 14. As will be readily understood, in some shutter blade arrangements it may be preferable to utilize a tension spring in place of compression spring 56 in a manner as is shown in U.S. Pat. No. 3,942,183, supra. Thus, with the spring connection herein described, the exposure control system of this invention is biased to continuously urge the shutter blade elements 20 and 21 into an open scene light unblocking orientation.

Figure 2:
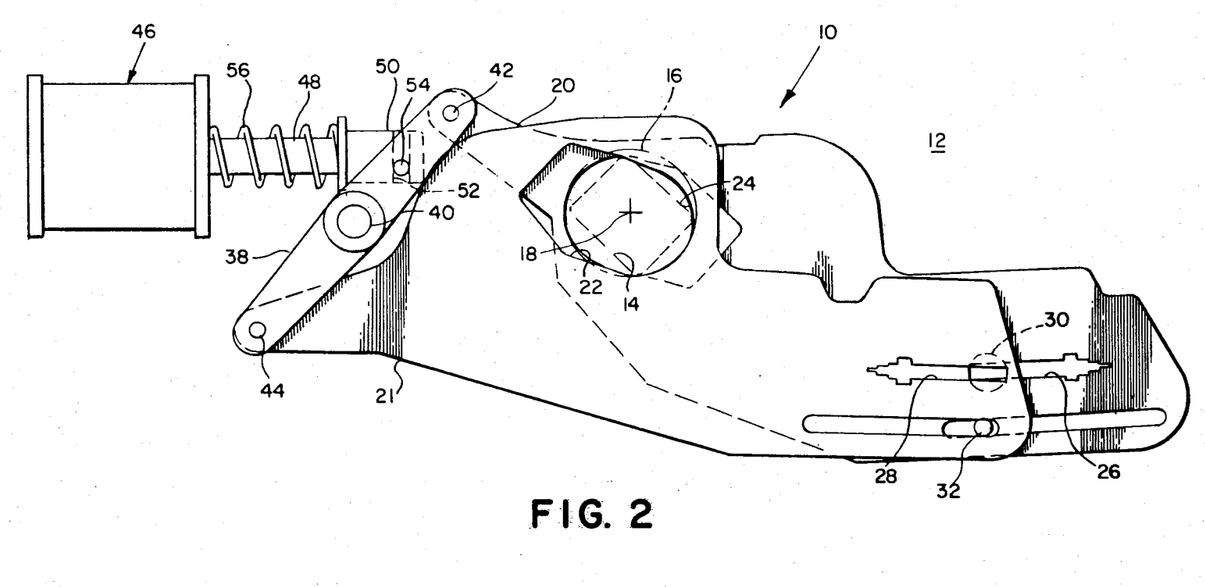
FIG. 2 is a front elevational view of the shutter blade mechanism of FIG. 1 in a different position from that of FIG. 1.
Figure 3:
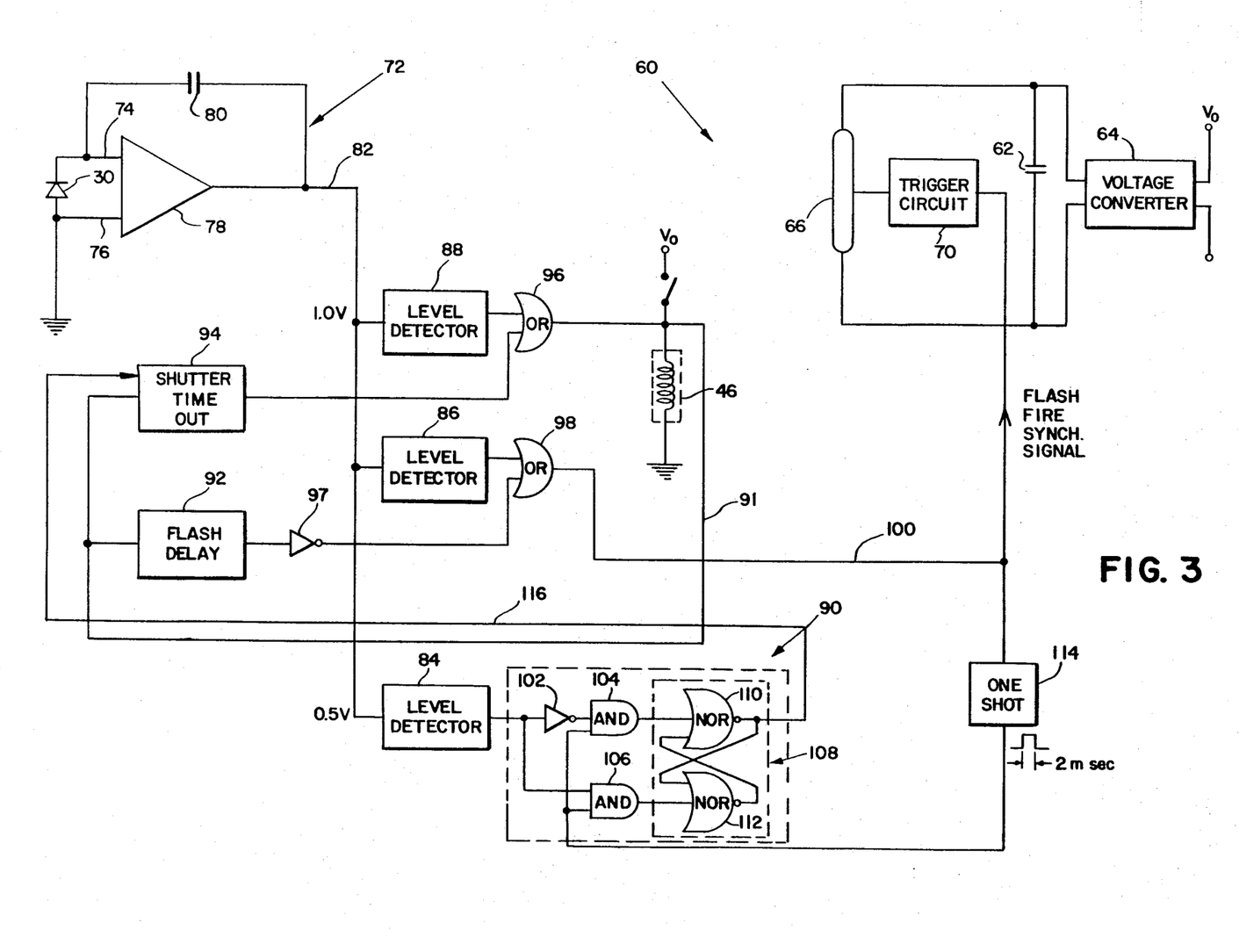
FIG. 3 is a front elevational view of the shutter blade mechanism of FIG. 1 in still another position from that of FIGS. 1 and 2.

In the present arrangement, the shutter blades 20 and 21 are drawn from their scene light unblocking open arrangement as shown in FIG. 3 to their scene light blocking closed arrangement as shown in FIGS. 1 and 2 when the solenoid 46 is energized. Consequently, energization of solenoid 46 prevents the shutter blades 20 and 21 from moving towards their maximum effective primary aperture defining arrangement under the urging of compression spring 56. However, it should be readily understood that the exposure control system of this invention would be equally applicable to photographic systems where the blades 20 and 21 are spring biased in a normally closed position. However, since in the preferred embodiment the shutter blade elements 20 and 21 are spring biased to move toward their scene light unblocking arrangement, it would otherwise be necessary to maintain the solenoid in a state of continued energization in order to hold the shutter blade elements 20 and 21 in their scene light blocking arrangement as shown in FIG. 1. Such continued energization of the solenoid 46, however, would present an intolerable power drain on the camera battery, particularly if the solenoid 46 had to be continuously energized even when the camera apparatus were not in use. In order to avoid this continued energization of the solenoid 46, there is provided a latch mechanism (not shown) which operates normally to latch the shutter blade mechanism in its scene light blocking arrangement as shown in FIG. 1 and which automatically unlatches the shutter blade mechanism to permit the shutter blade elements 20 and 21 to be moved to their scene light unblocking arrangement as shown in FIG. 3 in order to commence a photographic exposure cycle and which further automatically responds at the termination of an exposure cycle to relatch the shutter blade elements 20 and 21 in their scene light blocking arrangement so as to permit the deenergization of the solenoid 46. The manner in which the aforementioned latch operates is more fully described in U.S. Pat. No. 4,040,072, supra.

Figure 4:
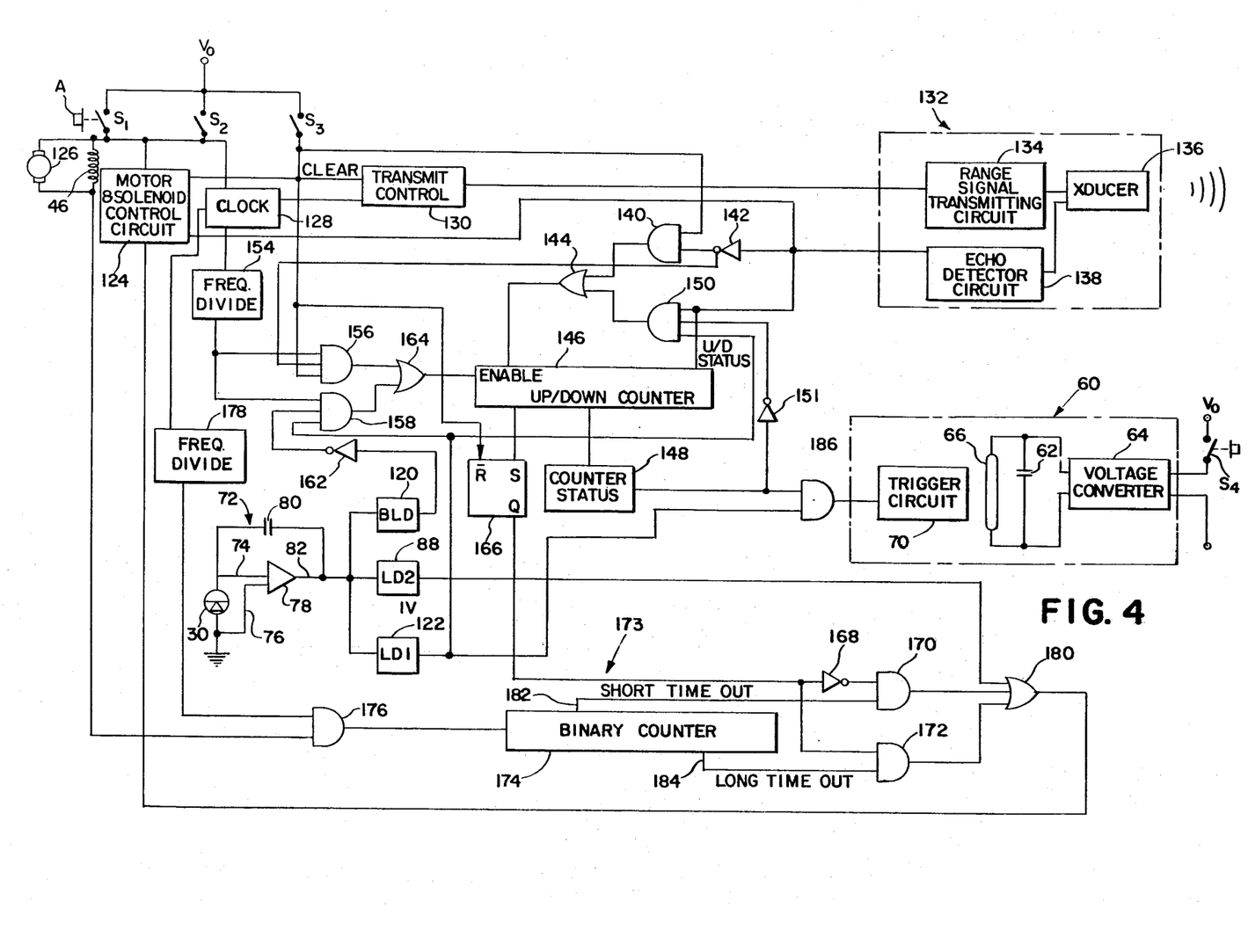
FIG. 4 is an electrical schematic view of the preferred embodiment for the control system of this invention.

Referring now to FIG. 4, there is shown a schematic wiring diagram for the exposure control circuit of this invention for providing either the shortened or extended maximum exposure interval time out period by means of sonic ranging. An electronic flash is shown at 60 and is cooperatively associated with the photographic camera apparatus to provide a source of artificial illumination to expose the film in a manner to be subsequently described. The electronic flash apparatus 60 comprises a main storage capacitor 62 which may be charged up to an operating voltage by any conventional voltage converter circuit as shown at 64. The voltage converter 64 operates in a conventional manner to convert a DC voltage, as may be derived from the camera battery (not shown) which can be in the order of 6 volts, to a suitable strobe operating voltage such as 350 volts. A flash tube 66 is connected in parallel relation with respect to the shortage capacitor 62. The flash tube 66 can be ignited by a trigger circuit 70 of any conventional form which is set in operation by a flash fire signal to be derived in the following manner.

As shown generally at 72, there is provided a scene light detecting and integrating control circuit comprising the photoresponsive element 30 connected across the input terminals 74 and 76 of an operational amplifier 78 of the differential variety. When considered ideally, the amplifier 78 has an infinite gain and an infinite input impedance and a zero output impedance. The input circuitry of the amplifier 78, however, is structured such that the apparent input impedance for the photoresponsive element 30 is substantially zero, thereby functioning in a manner which permits the photoresponsive element 30 to operate in a current mode. Consequently, the current generated by the photoresponsive element 30 is limited substantially only to its own internal impedance. To accomplish this effect, a feedback capacitor 80 is connected between one input terminal 74 of the operational amplifier 78 and an output terminal 82 from the operational amplifier 78.

With the feedback arrangement described, any difference of potential supplied by the photoresponsive element 30 across input terminals 74 and 76 will operate to cause a current of opposite polarity to be produced through feedback capacitor 80. As a consequence, the feedback capacitor 80 provides a substantially instantaneous feedback signal of opposite polarity which serves to counteract any differential signal voltage impressed by the photoresponsive element 30 across the input terminals 74 and 76. Thus, although the amplifier 78 has a very high input impedance, the photoresponsive element 30, when connected in the aforementioned manner, experiences only a very low input impedance to the amplifier 78. Therefore, the current output of the photoresponsive element 30 is directed into the feedback circuit 78. In this manner, the photoresponsive element 30 is connected to operate in a constant current mode of operation under conditions of non-varying scene light intensity to provide a substantially linear output response at output terminal 82 as is more fully described in U.S. Pat. No. 3,620,143, entitled "Automatic Exposure Control System with Fast Linear Response", by J. Burgarella, issued Nov. 16, 1971, in common assignment herewith and now incorporated by reference herein in its entirety.

The strobe and exposure control circuitry herein described preferably derive charging power from a battery that is insertable within the camera in correspondance with a film pack or cassette in a manner that is well known in the art for Polaroid SX-70 type film cassettes and cameras. The aforementioned film cassette battery is also preferably utilized to power the circuitry in FIG. 4 in its entirety by way of three switches $S_1$, $S_2$, and $S_3$ in a manner as is more fully described in U.S. Pat. No. 4,040,072, supra. The exposure control circuitry of this invention also includes a motor and solenoid control circuit 124 which operates in a manner also more fully described in U.S. Pat. No. 4,040,072, supra. As is readily apparent, the motor and solenoid control circuit 124 operates to control the energizing current delivered to the solenoid 46 and to a motor 126. The film units intended for use with the camera of this invention are preferably of the self-developing type, and the motor 126 is provided to effect the advancement and processing of the self-developing film units in a well-known manner.

There is also provides a sonic rangefinder as shown generally at 132 which is more fully disclosed in U.S. Pat. No. 4,199,246, entitled "Ultrasonic Ranging System for a Camera", by J. Muggli, issued Apr. 22, 1980, and U.S. Pat. No. 4,167,316, entitled "Sonar Controlled Lens Focus Apparatus", by B. Johnson et al., issued Sept. 11, 1979, in common assignment herewith and now incorporated by reference herein. The sonic rangefinder 132 includes a range signal transmitting circuit 134 which may be actuated in a manner to be herein described to issue a transmit commence signal to a sonic transducer 136 so as to cause the transmission of a sonar ranging signal comprising a burst of sonic energy. The transducer 136 thereafter operates to detect an echo signal reflected from the photographic subject at an elapsed time interval subsequent to the transmission of the sonar ranging signal. An echo detector circuit 138 then provides a signal indicative of this elapsed time period which corresponds directly to the distance between the camera and the subject to be photographed. Thus, the sonic rangefinder 132 provides an indication of an elapsed time period which corresponds to the distance between the camera and the subject to be photographed for reasons which will become more apparent from the following discussion.

When the electronic flash 60 is fully charged subsequent to the photographic closing a manually actuatable on/off power control switch $S_4$ in readiness for a photographic exposure cycle, a photographer may initiate a photographic exposure cycle by manually actuating a button A so as to close the switch $S_1$ in a manner as is fully described in U.S. Pat. No. 4,040,072, supra. Closure of the switch $S_1$, in turn, energizes the motor and solenoid control circuit 124 to provide the requisite control signal to energize the solenoid 46 and retract the plunger 48 inwardly to rotate the walking beam 38 in a counterclockwise direction from its position as shown in FIG. 1 to its position as shown in FIG. 2. This limited counterclockwise movement of the walking beam 38 operates to effect the release of a latch mechanism (not shown) while simultaneously effecting the closure of the switches $S_2$ and $S_3$ in a manner as is again more fully described in U.S. Pat. No. 4,040,072, supra.

Closure of the switch $S_3$, in turn, operates to provide a logic signal by way of the motor and solenoid control circuit to power down the solenoid 46 from an initial high current energization condition required to retract the plunger 48 to a low current energization condition required to temporarily hold the plunger in its retracted position as shown in FIG. 2. The powering down of the solenoid 46 to a holding current mode is accomplished in a manner as is fully described in U.S. Pat. No. 4,192,587, entitled "Proportional Fill Flash", by A. LaRocque et al., issued Mar. 11, 1980, in common assignment herewith and now incorporated by reference herein.

Closure of the switch $S_3$ in the aforementioned manner also operates to actuate the sonar rangefinder 132 to transmit the sonar ranging signal by providing the requisite logic signal to a transmit control circuit 130 so as to transmit the clock pulse from a clock circuit 128 to the range signal transmitting circuit 134. As is readily apparent, prior to closure of the switch $S_3$ there is provided a low (binary logic 0) output signal level to one input terminal of an AND gate 140 which, in turn, provides a low (binary logic 0) output signal level to one input terminal of an OR gate 144. The other input terminal to the OR gate 144 is also at a low (binary logic 0) output signal level received from an AND gate 150 which, in turn, receives one input from the echo detector circuit 138 which assumes a low (binary logic 0) output signal level prior to receipt of the echo signal by the transducer 36. The output signal from the OR gate 144, in turn, is directed to enable an up/down counter 146, and thus it becomes readily apparent that the up/down counter 146 is in a disabled state prior to the closure of the switch $S_3$. Closure of the switch $S_3$, in turn, provides an assertive (binary logic 1) output signal level to one input terminal of the AND gate 140 so as to switch the AND gate 140 to provide an assertive (binary logic 1) output signal level since the other input to the AND gate 140 is already at an assertive (binary logic 1) output signal level by virtue of the low (binary logic 0) output signal level from the echo detector circuit 138 being inverted by an inverter gate 142. Thus, the OR gate 144 also switches in synchronism with the closure of the switch $S_3$ to provide an assertive (binary logic 1) output signal level to enable the up/down counter 146. Also, as will be readily apparent, the up/down status of the counter 146 is controlled by the output signal from the echo detector circuit 138, and thus prior to receipt of an echo signal by the transducer 136, the counter 146 is set for an up count mode of operation by virtue of the low (binary logic 0) output signal level from the echo detector circuit 138.

As is readily apparent, the initial condition of the up/down counter 146 is empty and a counter status circuit 148 senses the terminal count of the counter 146 and provides an assertive (binary logic 1) output signal level as an indication that the up/down counter 146 is empty. The output from the counter status circuit 148 is directed to an inverter gate 151 so as to provide an enabling high (binary logic 1) output signal level to the AND gate 150 immediately after the up/down counter 146 starts to count up and the output from the counter status circuit 148 switches to a low (binary logic 0) output signal level.

The count is provided to the up/down counter 146 from the clock 128 by way of a frequency divide circuit 154 which inputs a pair of AND gates 156 and 158. As is readily apparent, a second input terminal to the AND gate 156 receives the inverted output signal from the echo detector circuit 138 by way of the inverter 142 and is thus enabled by an assertive (binary logic 1) output signal level prior to detection of the echo signal by the echo detect circuit 138. A third input terminal to the AND gate 156 receives an assertive (binary logic 1) output signal level upon closure of the switch $S_3$. A second input terminal to the AND gate 158 receives a signal level inverted by an inverter 162 from a brightness level detect circuit as shown at 120 for reasons which will become more apparent from the following discussion. A third input terminal to the AND gate 158 receives the output signal from a level detect circuit 122 for reasons which will also become apparent from the following discussion. The output signals from the AND gates 156 and 158 are, in turn, directed to an OR gate 164, which operates to input the clock pulse to the up/down counter 146.

Thus, as is now readily apparent, closure of the switch $S_3$ operates to signal the sonic rangefinder 132 to transmit a sonic ranging signal by way of the transducer 136 while simultaneously enabling the up/down counter 146 to count up the clock pulse received from the clock 128 by way of the frequency divide circuit 154, AND gate 156, and OR gate 164. In this manner, the up/down counter 146 is actuated to count up the clock pulse at the instant that the sonar ranging signal is transmitted by the sonar rangefinding circuit 132.

As is readily apparent, the aforementioned movement of the shutter blade mechanism from its position as shown in FIG. 1 to its position as shown in FIG. 2 also operates to move the photocell apertures 26A and 28A into overlapping relationship with respect to each other so as to admit scene light to the photoresponsive element 30. The photoresponsive element 30 responds to the incident scene light and provides an output signal to the brightness level detect circuit 120 which, in turn, provides a low (binary logic 0) output signal level if the intensity of detected scene light is below a select level and a high (binary logic 1) output signal level if the intensity of detected scene light is above the selected level in a manner as is more fully described in U.S. Pat. No. 4,192,587, supra. The selected level above which the brightness level detect circuit 120 provides a high (binary logic 1) output signal level and below which it provides a low (binary logic 0) signal level, for example, may be in the order of 10 c/ft.$^2$. The circuit herein described operates to provide the selected exposure interval time out period only under conditions where the ambient scene light intensity is less than the selected 10 c/ft.$^2$ and where the brightness level detect circuit 120 provides the low (binary logic 0) output signal level. The camera and flash apparatus herein described are capable of providing a proportional fill-in flash under conditions of high ambient scene light intensity above 10 c/ft.$^2$ where the brightness level detect circuit 120 provides a high (binary logic 1) output signal level in a manner as is more fully described in U.S. Pat. No. 4,192,587, supra. However, since the means for selecting the exposure interval time out period of this invention preferably does not operate in the proportional fill-in flash mode, it will not be further described herein and for further information regarding the circuitry for providing the fill-in flash mode of operation reference must be made to U.S. Pat. No. 4,192,587, supra.

Receipt of the echo signal by the transducer 136 signals the echo detector circuit 138 to provide an assertive (binary logic 1) output signal level to the inverter 142, the up/down status input terminal to the up/down counter 146, the AND gate 150, and the motor and solenoid control circuit 124 which responds by deenergizing the solenoid 46 to release the shutter blade elements 20 and 21 to commence an exposure cycle. The low (binary logic 0) output signal level from the inverter 142, in turn, disables the AND gate 140 so as to provide a low (binary logic 0) output signal level to the OR gate 144, in turn, switching the OR gate 144 to provide a low (binary logic 0) output signal level to disable the up/down counter 146. In addition, the assertive (binary logic 1) output signal level from the echo detector circuit 138 also operates to change the mode of operation of the counter 146 from an up count mode of operation to a down count mode of operation. The low (binary logic 0) output signal level from the inverter 142 also operates to disable the AND gate 156 from transmitting the clock pulse for the remainder of the exposure cycle.

The shutter time out portion of the circuit of this invention is shown generally at 173 and comprises a binary counter 174 which receives the clock pulse from the clock 128 by way of a frequency divide circuit 178 and an AND gate 176. The output from the binary counter 174 is decoded at line 182 to provide a shortened maximum exposure time out signal which is directed to an AND gate 170, the output from which is directed to an OR gate 180. The binary counter 174 is also decoded at line 184 to provide an extended maximum exposure interval time out signal to an AND gate 172, the output from which is directed to an OR gate 180. The AND gates 170 and 172 also receive additional input signals from a latching flip-flop circuit 166 which receives a decode output signal from the up/down counter 146 when the up count surpasses a number of pulses corresponding to a selected camera-to-subject range. The output from the OR gate 180 is thereafter directed to the motor and solenoid control circuit 124 to control the reenergization of the solenoid 46 and the termination of the exposure interval in a manner to be subsequently described.

As previously discussed, the up/down counter 146 initially counts up the clock pulse in synchronism with the transmission of the ranging signal by the sonic rangefinder 132 so that the number of clock pulses counted by the counter 146 corresponds directly to the camera-to-subject range. During the aforementioned up count mode of operation of the counter 146, a decode signal will be provided to the flip-flop 166 to switch the output signal therefrom to an assertive (binary logic 1) output signal level in the event that the subject is located far beyond the effective range of the flash so that virtually no reflected flash light can be expected to reach the photoresponsive element 30. Conversely, if the photographic subject is located only slightly beyond the effective range of the flash, where there still may be sufficient reflected flash light to provide for a very acceptable photograph, the decode signal will not be provided to the flip-flop 166 and the output therefrom will remain at a low (binary logic 0) output signal level.

The photographic exposure cycle starts upon the deenergization of the solenoid 46 in the aforementioned manner which releases the shutter blade elements 20 and 21 for movement from the scene light blocking arrangement of FIG. 2 to the scene light unblocking arrangement of FIG. 3. The shutter blade elements 20 and 21 are thereby moved by the walking beam 38 and compression spring 56 in directions which operate to progressively enlarge the effective scene lighted admitting primary aperture defined by the overlapping apertures 22 and 24 over the light entry exposure opening 14. Rotation of the walking beam 38, as previously discussed, effects a simultaneous linear and angular movement of the blade elements 20 and 21 about the pivot pin so that the photocell sweep secondary apertures 26 and 28 define a corresponding and progressively enlarging effective photocell sweep aperture over the photoresponsive element 30.

An LED (not shown) is aligned coaxially with respect to the photoresponsive element 30 on the opposite side of the shutter blade elements 20 and 21 so as to provide illumination detectable by the photoresponsive element 30, when the secondary apertures 26 and 28 first overlap without interfering with the transmission of scene light through the apertures 26 and 28. Alternatively, separate apertures (not shown) may be provided to admit the light from the LED to the photocell 30 in synchronism with the commencement of the exposure interval in a manner as is described in both U.S. Pat. No. 3,628,437, entitled "Photographic Camera", issued Dec. 21, 1971 and U.S. Pat. No. 4,192,587, supra. The LED (not shown) is energized in a normal manner to provide illumination for a set period of time subsequent to release of the shutter blade elements 20 and 21 so that regardless of the actual low ambient scene light intensity conditions, an indication may be provided as to the first instant which the primary apertures 44 and 46 overlap to admit scene light to the focal plane since the light from the LED is admitted to the photocell 30 at the exact instant that the secondary apertures 22 and 24 first overlap.

The photocell 30 responds to the light emitted from the LED at the instant that the secondary apertures 22 and 24 first overlap to provide an output signal to the integrator 72 which, in turn, triggers the level detector 122 at a normalized trigger voltage of approximately 0.1 volts to provide an assertive (binary logic 1) output signal level therefrom which is directed to one input terminal of the AND gate 150 and operates to switch the AND gate 150 to provide an assertive (binary logic 1) output signal level to the OR gate 144, in turn, switching the OR gate 144 to an assertive (binary logic 1) output signal level thereby enabling the up/down counter 146 to count down from the previous count stored during the sonar ranging operation. The assertive (binary logic 1) output signal level from the level detector 122 is also directed to one input terminal of the AND gate 158 so as to enable the AND gate 158 to transmit the clock pulse received from the clock 128 by way of the frequency divide circuit 154. The clock pulse is thereafter gated by the OR gate 164 to the up/down counter 146. As previously discussed, the up/down counter 146 is actuated to operate in its down count mode of operation by virtue of the assertive (binary logic 1) output signal level received from the echo detector circuit 138 upon receipt of the ranging signal.

Deenergization of the solenoid 46 to commence the exposure interval also provides a high (binary logic 1) output signal level to enable the AND gate 176 to gate the clock pulse received from the clock 128 by way of the frequency divide circuit 178. In this manner, deenergization of the solenoid 46 starts the counter 174 counting to provide either the shortened or extended maximum exposure interval time out period in the following manner.

Under the aforementioned conditions of low ambient scene light intensity, the counter 146 will empty and the output from the counter status circuit 148 will switch from a low (binary logic 0) output signal level to an assertive (binary logic 1) output signal level to switch an AND gate 186 and provide an assertive (binary logic 1) output signal level to trigger the flash trigger circuit 70 and thereby fire the flash tube 66 in a well-known manner. The AND gate 186 was enabled by an assertive (binary logic 1) output signal received from the level detector 122 in the aforementioned manner and operates to inhibit the premature firing of the flash 60 at the initial instant when the counter 146 starts to count up from zero. The down count of the counter 146 provides a range responsive time signal commencing in correspondence with the initiation of the exposure interval and terminating at a subsequent time corresponding to the distance between the camera and the subject to be photographed thereby firing the flash at an appropriate aperture size corresponding to the camera-to-subject distance in the manner as is more fully described in U.S. Pat. No. 4,188,103, entitled "Sonar Strobe Firing with Scanning Shutter", by C. Biber et al., issued Feb. 12, 1980, in common assignment herewith and now incorporated by reference herein and U.S. Pat. No. 4,192,587, supra. The assertive (binary logic 1) output signal level from the counter status circuit 148 is also inverted by the inverter 151 to disable the AND gate 150 and provide a low (binary logic 0) output signal level by way of the OR gate 144 to disable the counter 146.

If the photographic subject is within the effective range of the flash and displays an average scene light reflectance characteristic, there will be provided an immediate and substantial increase in the reflected scene light directed to the photoresponsive element 30. The photoresponsive element 30 and its associated light integrating circuit 72 will respond immediately to this increased reflected scene light to provide the required voltage to trigger another level detector 88. For purposes of illustration, the level detector 88 is configured to trigger upon the input reaching 1 volt which is a normalized value representative of an optimum or select film exposure value for a predetermined film speed. The level detector 88 provides an assertive (binary logic 1) output signal level to the OR gate 180 so as to switch the OR gate 180 and provide an assertive (binary logic 1) output signal level back to the motor and solenoid control circuit so as to effect the reenergization of the solenoid 46. The plunger is thereby retracted and operates to rotate the walking beam 38 in a counterclockwise direction back to the scene light blocking arrangement as shown in FIGS. 1 and 2 in order to terminate the exposure interval.

However, in the event that the photographic subject is either within the effective range of the flash and has a low degree of light reflectance or is just beyond the effective range of the flash, there will likely not be provided a sufficient increase in reflected flash light incident to the photoresponsive element 30 for the light integrating circuit 72 to reach the required voltage (1.0 volt) to trigger the level detector 88. However, as previously discussed, in these situations where the photographic subject is within the effective range of the flash and has a low degree of flash light reflectance or is only slightly beyond the effective range of the flash, there may still be sufficient reflected flash light to provide for a very acceptable photograph. Thus, under these conditions, it becomes desirable to limit the exposure interval time out period to the maximum allowable time to which an exposure interval may be extended without incurring the adverse blurring effects from the normally expected hand motion of a handheld camera. Toward this end, the binary counter 174 and AND gates 170 and 172 operate to provide a shortened maximum exposure time out period in the following manner.

If the photographic subject is located within the effective range of the flash or just beyond the effective range of the flash, the up/down counter 146 will not count up a sufficiently high number of pulses during the initial sonar ranging operation to provide a decode signal to switch the flip-flop 166 which will thereby continue to provide a low (binary logic 0) output signal level to the AND gate 172. The low (binary logic 0) output signal level from the flip-flop 166 will be inverted by the inverter 168 to enable the AND gate 170 to switch upon receiving a decode output signal from the binary counter 174 along line 182 while simultaneously disabling the AND gate 172. The AND gate 170, in turn, provides an assertive (binary logic 1) output signal level to the OR gate 180 so as to switch the OR gate 180 to provide an assertive (binary logic 1) output signal level to the motor and solenoid control circuit 124 so as to, in turn, energize the solenoid 46 and terminate the exposure interval in a well-known manner. In this manner, the binary counter 174 provides a decode output signal to impose a shortened maximum exposure interval time out period in the event that there is insufficient scene light for the photocell 30 and light integrator 72 to trigger the level detector 88. The shortened maximum exposure time out interval provided by the shutter time out circuit 94 generally coincides with the maximum time allowable to which an exposure interval may be extended without incurring any adverse blurring effects from the normally expected hand motion of a handheld photographic apparatus.

Therefore, in the event that there is neither sufficient available ambient scene light and/or reflected artificial light for the output signal from the light integrator circuit to reach 1 volt, the shutter time out circuit 173, which commences timing in synchronism with the de-energization of the solenoid 46 and release of the shutter blade elements 20 and 21, will operate to provide an assertive (binary logic 1) output signal level and a shortened maximum exposure interval time out period which, for example, may be in the order of 50 milliseconds as controlled by the assertive (binary logic 1) output signal level received from the decode signal along line 182 from the binary counter 174. As should be readily understood, such an exposure interval may still not be sufficient to provide the optimum film exposure; however, there may still be provided a photograph of generally acceptable quality to the photographer which would otherwise have been entirely lost.

Under conditions of low ambient scene light intensity where the photographic subject is located far beyond the effective range of the flash so that no reflected flash light can be expected to reach the photoresponsive element, the up/down counter 146 will count up by a sufficient number of pulses during the initial sonar ranging operation to provide a decode signal to the flip-flop 166 so as to switch the output therefrom to an assertive (binary logic 1) output signal level so as to enable the AND gate 172. As is readily apparent, the AND gate 170 is disabled by the inverted output signal level from the flip-flop 166. Under these conditions, the decode signal along line 184 from binary counter 174 is gated by the AND gate 172 to provide an assertive (binary logic 1) input signal to the OR gate 180 so as to switch the OR gate 180 and provide an assertive (binary logic 1) output signal level to the motor and solenoid control circuit to energize the solenoid 46 and terminate the exposure interval in a well-known manner.

The decode signal provided at line 184 operates to extend the maximum exposure interval time out period to a far greater time than the maximum allowable time to which an exposure interval may be extended without incurring the adverse blurring effects from the normally expected hand motion of a handheld camera. This extended maximum exposure time out period may be in the order of 350 milliseconds and would provide a true time photograph under conditions where the camera is preferably held on a tripod or some other stable mount. Since under these conditions little or none of the artificially provided light by the flash is reflected from the scene, a shutter maximum exposure interval time out period allows the photographic film to record all the existent ambient scene light such as starlight, street lights, window lights, etc.

Other embodiments of the invention, including additions, subtractions, deletions and other modifications of the preferred disclosed embodiments of the invention will be obvious to those skilled in the art and are within the scope of the following claims.

What is claimed is:

1. An exposure control circuit for controlling the maximum time out period for an exposure interval in a photographic camera apparatus of the type including means for defining a film plane, means for transmitting light from a scene along an optical path to expose photosensitive film located in the film plane, and an exposure control system for allowing the passage of scene light along the optical path to the film plane to define an exposure interval, said circuit comprising:
  clock means for providing a train of clock pulses;
  first counter means for counting said pulse train and providing a total pulse train count corresponding to the camera-to-subject distance range;
  second counter means for counting said pulse train and providing a pulse train count which commences generally in synchronism with the initiation of the exposure interval; and
  logic means responsive to said first counter means providing a pulse train count corresponding to a camera-to-subject distance less than a select camera-to-subject distance for enabling the decode of said second counter means to provide an exposure interval termination signal upon said second counter means reaching a pulse train count corresponding to a select maximum exposure interval time out period, and further responsive to said first counter means providing a pulse train count corresponding to a camera-to-subject distance greater than said select camera-to-subject distance for enabling the decode of said second counter means to provide an exposure interval termination signal upon said second counter means reaching a pulse train count corresponding to another maximum exposure interval time out period greater than said select maximum exposure interval time out period.

2. The exposure control circuit of claim 1 wherein said first counter means includes sonic ranging means comprising means for transmitting a sonic ranging signal in synchronism with the commencement of said pulse train count and means for receiving an echo from a photographic subject in synchronism with the termination of said pulse train count.

3. The exposure control circuit of claim 1 wherein said logic means includes a first AND gate having one input terminal connected to be enabled by an assertive logic input signal level when said first counter means provides a total pulse train count corresponding to a camera-to-subject distance less than said select camera-to-subject distance and another input terminal connected to decode said second counter means upon receipt of an assertive binary logic input signal level when the pulse train count from said second counter means receives a value corresponding to said select maximum exposure interval time out period, and a second AND gate having one input terminal connected to be enabled by an assertive binary logic input signal level when said first counter means provides a total pulse train count corresponding to a camera-to-subject distance greater than said select camera-to-subject distance and another input terminal connected to decode said second counter means upon receipt of an assertive binary logic input signal level when the pulse train count from said second counter means reaches a value corresponding to said other maximum exposure interval time out period greater than said select maximum exposure interval time out period.

4. The exposure control circuit of claim 3 wherein said logic means further includes a latching means for decoding said first counter means and providing an assertive binary logic output signal level upon the pulse train count reaching a number corresponding to said select camera-to-subject distance, said logic means further including means for: inverting the output signal level from said latching means, connecting said inverted signal level to said one input terminal of said first AND gate, and connecting said output signal from said latching means to said one input terminal of said second AND gate.

5. The exposure control circuit of claim 1 wherein said select maximum exposure interval time out period is generally the maximum allowable time to which an exposure interval may be extended without incurring adverse blurring effects from the normally expected hand motion of a handheld photographic camera apparatus and wherein said other maximum exposure interval time out period is generally far greater than said select maximum exposure interval time out period.

* * * * *